United States Patent Office 2,731,339
Patented Jan. 17, 1956

2,731,339

LOW VOLATILITY HERBICIDAL COMPOSITIONS

William R. Davie, Pittsburgh, Pa., assignor to Pittsburgh Coke & Chemical Company, Pittsburgh, Pa., a corporation of Pennsylvania No Drawing. Application November 21, 1952,
Serial No. 321,947

8 Claims. (Cl. 71—2.6)

This invention relates to new herbicidal esters of 2-ethyl hexanol-1 with an aryloxyacetic acid selected from the group consisting of phenoxyacetic acid, 2-methylphenoxyacetic acid, naphthoxyacetic acid and halogenated derivatives thereof, and is more particularly concerned with the 2-ethyl hexanol-1 ester of 2,4-dichlorophenoxyacetic acid, 2,4,5-trichlorophenoxyacetic acid and 4-chloro-2-methylphenoxyacetic acid, and to herbicidal compositions containing such esters as the essential active ingredient.

The invention also comprehends concentrated solvent solutions of such esters, and solutions of such solvent solutions in fuel or diesel oil.

The invention further includes aqueous emulsions prepared from such solvent solutions.

FIELD OF INVENTION

In the past few years, aryloxyacetic acid esters, and in particular, the esters of 2,4-dichlorophenoxyacetic acid, 2,4,5-trichlorophenoxyacetic acid and 4-chloro-2-methylphenoxyacetic acid, have come into prominence as herbicides for the selective control of broad leaf weeds in narrow leaf grains and certain other crop or ornamental plants.

In order to practicably employ aryloxyacetic acid esters, and in particular, the esters of 2,4-dichlorophenoxyacetic acid, 2,4,5-trichlorophenoxyacetic acid and 4-chloro-2-methylphenoxyacetic acid, in herbicidal concentrated solvent solutions, it is vital that the concentrated solvent solution have many characteristics in addition to its mere ability to act as a herbicide. These characteristics are as follows:

(1) The concentrated solvent solution must be capable of being stored for long periods at low temperatures without having the ester crystallize out from the solution. If crystallization does occur, redissolution may be difficult. The presence of crystals in the concentrated solvent solution at the time of spraying leads to clogging of the spray equipment, renders accurate control of the distribution of the herbicide very difficult, decreases the effectiveness of a given quantity of herbicidal solutions, and generally renders the solution unsatisfactory from a practical standpoint. Any effort to concentrate the solvent solution to as great an extent as possible antagonizes the problem of avoiding crystallization, since the original solution at normal temperatures would be closer to its saturation point. The need for low volatility further complicates this problem in view of the fact that low volatility is generally related to high molecular weight, which in turn is normally accompanied by solidity (high melting point) and limited solubility. A practical solvent solution should contain at least four pounds of the acid in the form of the ester in a gallon of solution, and must remain homogeneous at least down to 0° F.

(2) The solvent solution must be soluble in oils having low aromatic content. Since efficient application of the subject herbicides frequently requires the application of a fuel or diesel oil solution of the herbicide, it is essential that the ester selected have a high solubility in these oils which are generally poor solvents.

(3) It is vital that the ester possess low volatility. High volatility permits drift of the herbicidal vapors to susceptible plants, the injuring of which is not desired. There are, however, practical limits to the selection of a low volatile ester. The difficulty or mere resort to higher molecular weight esters has already been discussed in connection with the cold stability of the concentrated solvent solution, but it should additionally be noted that resort to esters of high molecular weight reduces the acid equivalency of the ester so that a greater weight of ester must be dissolved to make available in the solution a given quantity of the aryloxyacetic acid. Consequently, mere resort to higher molecular weight esters means that more of a less soluble material must be maintained in solution. The increased cost of the high molecular weight alcohols necessary for the production of high molecular weight esters is another factor which makes it undesirable to resort to the simple expedient of utilizing high molecular weight esters.

(4) Herbicidal solvent solutions should have relatively low specific gravity (the specific gravity should not be too different from the specific gravity of water), so that stable aqueous emulsions can be readily produced. In other words, what is here required is that the specific gravity of the ester itself be very little above 1.2, and that the ester be soluble in a solvent having a specific gravity between 0.8 and 1.0 so that the solution of the ester in the solvent will have a specific gravity approximately equal to 1.0.

OBJECTS

A principal object of this invention is the provision of new herbicidal esters of an aryloxyacetic acid selected from the group consisting of phenoxyacetic acid, 2-methylphenoxyacetic acid, naphthoxyacetic acid and halogenated derivatives thereof with 2-ethyl hexanol-1, and more especially, the 2-ethyl hexanol-1 esters of 2,4-dichlorophenoxyacetic acid, 2,4,5-trichlorophenoxyacetic acid and 4-chloro-2-methylphenoxyacetic acid. Further objects include:

(1) The provision of such esters which have very low vapor pressure, and at the same time, (a) have a relatively high acid equivalency, and (b) are highly soluble in conventional solvents so that concentrated solvent solutions may be prepared capable of being stored for long periods at low temperatures without having the ester crystallize out from the solution, and if crystallization does occur, the ester will redissolve easily when normal temperatures are restored.

(2) The provision of such esters as aforementioned, which esters are soluble in oils of low aromatic content so that oil solutions of the same may be prepared.

(3) The provision of such esters as aforementioned, concentrated solvent solutions of which will have a specific gravity approximately equal to 1.0, so that stable aqueous emulsions may be prepared from the same.

(4) The provision of such esters as aforesaid, which can be produced by a rapid esterification process.

Further objects will be apparent from the listing of necessary characteristics in addition to mere herbicidal activity given hereinbefore, and the detailed description given hereinafter.

GENERAL DESCRIPTION

These objects are accomplished according to the present invention by the provision of new 2-ethyl hexanol-1 esters of aryloxyacetic acid selected from the group consisting of phenoxyacetic acid, 2-methyl-phenoxyacetic acid, naphthoxyacetic acid and halogenated derivatives thereof.

These objects are preferably accomplished by the provision of new 2-ethyl hexanol-1 esters of a phenoxyacetic acid selected from the group consisting of 2,4-dichlorophenoxyacetic acid, 2,4,5-trichlorophenoxyacetic acid and 4-chloro-2-methylphenoxyacetic acid.

Such esters are compounded with solvents, extenders, wetting agents, other herbicidal materials or the like to form new herbicidal compositions.

The success of the present invention is due to a large extent to the discovery that the aforesaid 2-ethyl hexanol-1 esters are unique in that they have (1) low volatility, (2) relatively high acid equivalency, (3) are readily soluble in conventional solvents, which solubility is maintained to an unusual extent at low temperatures, (4) are soluble in oils of low aromatic content, and (5) have a specific gravity very little above 1.2. Consequently, it has been found that the aryloxyacetic acid esters of 2-ethyl hexanol-1, and in particular, the 2,4-dichlorophenoxyacetic acid, 2,4,5-trichlorophenoxyacetic acid and 4-chloro-2-methylphenoxyacetic acid, have the aforementioned attributes for use as herbicides or for the formation of herbicidal compositions.

*Examples*

A more complete understanding of the new products and compositions of this invention may be had by reference to the following illustrative examples of actual operations in accordance with the invention.

*Example I.*—The 2-ethyl hexanol-1 ester of 2,4,5-trichlorophenoxyacetic acid may be prepared by heating under reflux with stirring for 45 minutes a mixture of 255.5 grams (1.0 mol) of 2,4,5-trichlorophenoxyacetic acid, 137 grams of 2-ethyl hexanol-1 (1.0 mol plus 5% excess), 0.6 milliliters of concentrated sulfuric acid, and 75 milliliters of benzene. Suitable apparatus for performing the reaction may be equipped with a water trap so that the water produced by the reaction between the acid and alcohol and which is distilled off together with the refluxing benzene may be withdrawn from the condensate before returning the benzene to the reaction vessel. At the end of this time, the organic acid content determined by titration was 0.3%. The mixture was extracted to remove the sulfuric acid by shaking thoroughly with 200 milliliters of 0.5% sodium hydroxide, and then twice with about 200 milliliters of water. After separation of the ester from the benzene, which may be accomplished by distilling off the more volatile benzene, the material was heated under reduced pressure to about 120° C. The yield of the ester was 91% of that which theoretically could have occurred, and the analysis of the reaction product showed the presence of 99.5% of the ester and 0.3% of the acid. The ester is immiscible with water, but completely miscible with most organic solvents. Attempts to cause the ester to crystallize have been successful, and the ester melts at 11° to 13° C.

The 2,4-dichlorophenoxyacetic acid ester of 2-ethyl hexanol-1 may be prepared in the same manner by employing 221 grams of 2,4-dichlorophenoxyacetic acid in place of the 255.5 grams of 2,4,5-trichlorophenoxyacetic acid employed in the above example.

The above procedure, when applied to the production of other esters, such as the tetrahydrofurfuryl and butyl cellusolve esters, showed significantly slower esterification rates. For example, the tetrahydrofurfuryl ester of 2,4,5-trichlorophenoxylacetic acid, after 3 hours of reflux, still contained 1.14% of free 2,4,5-trichlorophenoxyacetic acid, and the butyl cellusolve (butoxy ethanol) ester still contained 0.6% free 2,4,5-trichlorophenoxyacetic acid after 1½ hours.

*Example II.*—The 2,4,5-trichlorophenoxyacetic acid ester of 2-ethyl hexanol-1 of Example I may be employed to produce a concentrated solvent solution by disolving 65.3% by weight of the ester in 28.7% of a high boiling naphtha and then adding 6.0% of an emulsifying agent. Suitable emulsifying agents are nonionic emulsifiers such as those mentioned in the United States patent to Jones, No. 2,390,941, of December 11, 1945. The mixing may be conducted at room temperature, i. e., 18° C. The concentrated solvent solution so prepared is a free flowing liquid easily dispersible in water, and remains a free flowing liquid even at temperatures below 0° F.

The 2,4,5-trichlorophenoxyacetic acid ester of 2-ethyl hexanol-1 of Example I may be used in conjunction with esters of other herbicidal acids to provide a concentrated solvent solution of esters of a plurality of herbicidal acids. For example, 29.2% by weight of the 2,4,5-trichlorophenoxyacetic acid ester of 2-ethyl hexanol-1 of Example I may be mixed with 30.6% of the 2,4-dichlorophenoxyacetic acid ester of 2-ethyl hexanol-1 of Example I, 6.0% of an emulsifying agent, and 34.2% of a high boiling naphtha to provide a suitable concentrated solvent solution of a mixture of herbicidal acid esters.

*Example III.*—The concentrated solvent solutions of Example II may be dissolved in an oil solvent such as fuel oil, diesel oil or kerosene by mixing one gallon of the solution in 25 gallons of oil. The mixture is homogeneous, and does not separate when agitation is stopped, after mixing has taken place.

The mixture of oil and solvent solution so prepared may be applied to freshly cut stumps to prevent resprouting of the same, used for dormant applications, and is effective against difficult-to-kill plants. A customary method of application of the above mixture is to apply the same as a spray from a plane, so that 26 gallons of the mixture is applied to four acres.

*Example IV.*—The concentrated solvent solutions of Example II may be formed into a herbicidal aqueous emulsion useful for application to weeds and brush. The emulsion may be produced by mixing 3 quarts of the concentrated solvent solution with 100 gallons of water, and agitating slightly to give a uniform emulsion. This emulsion is quite stable and will remain as such with little or no further agitation. This emulsion yields excellent control of herbaceous plants susceptible to 2,4,5-trichlorophenoxyacetic acid by spraying at the rate of about 30 gallons per acre.

DETAILED DESCRIPTION

The aforementioned necessary characteristics eliminate substantially all known alcohols. Alcohols having less than six carbon atoms do not yield esters possessing sufficiently low volatility. Alcohols having more than ten carbon atoms yield esters which are insufficiently soluble and cause the resulting ester to possess a low acid equivalency. Cycloalkyl, heterocyclic and highly oxygenated alcohols yield esters which are not sufficiently soluble in oil. The heptyl, nonyl and decyl alcohols are not sufficiently available to constitute a feasible solution to the problem, even if one or more of them were, in fact, capable of doing so.

With reference to the octyl alcohols, n-octyl alcohol yields an ester which is insufficiently soluble at low temperatures, and 6-methyl heptanol-1 appears to be quite similar to n-octyl alcohol.

I have found that 2-ethyl hexanol-1 will produce herbicidal esters with aryloxyacetic acids possessing low volatility coupled with a sufficiently high acid equivalency, and which, in addition, are quite soluble in fuel oil, can be produced by a rapid esterification process, will yield concentrated solvent solutions containing at least four pounds per gallon equivalent of herbicidal acids from which the ester will not crystallize out upon prolonged storage at temperatures as low as 0° F., and will produce, when emulsified with water, an emulsion which has good stability. When the concentration of the ester in the concentrated solvent solution is raised well above four pounds per gallon equivalent of herbicidal acids and subjected to low temperatures for a prolonged period of time, a small amount of crystallization may occur. However, when the temperature is increased somewhat, the crystals go back into solution rapidly.

The esters produced from a given alcohol and 2,4-dichlorophenoxyacetic acid usually melt 10° to 20° C. lower than the corresponding ester of 2,4,5-trichlorophenoxyacetic acid. The esters produced from a given alcohol and 4-chloro-2-methylphenoxyacetic acid usually melt 20° to 40° C. lower than the corresponding ester of 2,4,5-trichlorophenoxyacetic acid. It can consequently be seen that the problem of forming a highly concentrated cold stable solvent solution is more difficult in relation to 2,4,5-trichlorophenoxyacetic acid than it is with regard to the other acids which are the subject of the present invention, although the problem is a pressing one in regard to all.

That the 2-ethyl hexanol-1 esters of aryloxyacetic acids produce herbicidal concentrated solvent solutions which are more cold stable than the usual esters can be seen from the following information:

Concentrated solvent solutions were prepared from one of the commonly used aromatic solvents such as methylated naphthalene or xylene and various esters of 2,4,5-trichlorophenoxyacetic acid. These concentrated solvent solutions were prepared to contain the equivalent of four pounds of 2,4,5-trichlorophenoxyacetic acid as ester per gallon.

The following alkyl esters of 2,4,5-trichlorophenoxyacetic acid did not produce concentrated solvent solutions stable at 0° F. with the above solvents: n-amyl, n-hexyl, methylamyl, methylcyclohexyl, octanol-2 (capryl), n-octyl, di-isobutyl carbinol, n-decyl, n-nonyl, lauryl, methoxy-methoxyethyl and cetyl. All crystallized out appreciably at 0° F.

On the other hand, a concentrated solvent solution prepared from the 2-ethyl hexanol-1 ester with the above solvents was stable on storing for a prolonged period at 0° F.

The following table shows the unexpected solubility of the 2-ethyl hexanol-1 ester of 2,4,5-trichlorophenoxyacetic acid in common kerosene in relation to other esters of 2,4,5-trichlorophenoxyacetic acid:

TABLE I

| Ester of 2,4,5-trichlorophenoxyacetic acid | Solubility in kerosene at 25° C. |
| --- | --- |
| n-amyl (unduly volatile) | miscible. |
| n-hexyl (unduly volatile) | miscible. |
| 2-ethyl butyl (unduly volatile) | miscible. |
| octanol-2 (capryl) | 5 to 10%. |
| n-octyl | 5 to 10%. |
| n-decyl | 5 to 10%. |
| di-isobutylcarbinol | 5 to 10%. |
| lauryl | 5 to 10%. |
| cetyl | 5 to 10%. |
| 2-ethyl hexanol-1 | miscible. |

In accordance with conventional practice, the herbicidal aryloxyacetic acid esters of the present invention may be used alone or in conjunction with one another, as well as in admixture with other herbicidal ingredients. For example, the 2-ethyl hexanol-1 ester of 2,4,5-trichlorophenoxyacetic acid may be used in admixture with either the 2-ethyl hexanol-1 ester or other ester of either 2,4-dichlorophenoxyacetic acid or 4-chloro-2-methylphenoxyacetic acid, and the esters of 2,4-dichlorophenoxyacetic acid and 4-chloro-2-methylphenoxyacetic acid may be used in admixture, a 1:1 ratio of the 2-ethyl hexanol-1 esters of 2,4,5-trichlorophenoxyacetic acid and 2,4-dichlorophenoxyacetic acid being illustrative.

Suitable solvents which may be employed for the purpose of compounding a concentrated solvent solution with the new esters of the subject invention are water insoluble or nearly water insoluble ketones such as di-isobutyl ketone and the like, water insoluble or nearly water insoluble esters such as dibutyl phthalate, amyl acetate and the like, high boiling petroleum naphthas within the boiling range of about 100° to about 400° C. (the common petroleum naphthas that are generally used boil in the range of from 150° to 300° C.), kerosene or other hydrocarbon oils such as methylated naphthalene and xylene. Co-solvents such as dimethyl ketone and isopropyl alcohol may be employed, but it should be noted that the use of water-soluble co-solvents decreases the efficiency of emulsification of the concentrates. Suitable emulsifying agents have been previously referred to, and common non-ionic emulsifiers which are commercially available such as derivatives of polyoxyethylene are generally used. Spreading agents and adhesives may also be employed, but because of the ability of the esters of the present invention to spread by themselves and resist washing off, these agents are not necessary.

The concentration of the herbicidal agent in the solvent may vary greatly, e. g., 5% to 95%, and still realize herbicidal activity. However, practicable solvent solutions must be highly concentrated and should contain at least four pounds of the acid as the ester per gallon of total solution of the ester in the solvent.

In the preparation of oil-base sprays, about one to six gallons of the concentrated solvent solution are employed to twenty gallons of oil.

Aqueous emulsions of the concentrated solvent solution generally contain from one to 25 quarts of the solution for each 100 gallons of water. In such aqueous emulsions, ion sequestering agents, such as ethylene di-amine tetra-acetic, citric or glycolic acids or the like, may be employed, particularly when hard water is used.

I believe that the ease of dissolving, and perhaps to some small extent, the solubility of various esters, depends on the physical state of the ester in question. Thus, esters that are liquid at a particular temperature are considerably easier to dissolve at that temperature and appear to show higher solubility than a very closely related compound which is solid at that temperature. If the cold stability of a four-pound concentrated solvent solution, as discussed previously, and the kerosene solubility, as discussed in Table I, are considered in the light of the melting points of the 2,4,5-trichlorophenoxyacetic acid esters listed below in Table II, it will be seen that the 2-ethyl hexanol-1 ester has a lower melting point than the amyl and hexyl esters, which are themselves unsatisfactory for the purpose of the present invention because of high volatility.

TABLE II

| Ester | Approximate Melting Point, ° C. |
| --- | --- |
| n-amyl | 15 |
| n-hexyl | 26 |
| methyl amyl | 40 |
| octanol-2 (capryl) | 34 |
| 2-ethyl hexanol-1 | 12 |
| di-isobutyl carbinol | 54 |
| n-nonyl | 43 |
| n-decyl | 40 |
| lauryl | 48 |
| cetyl | 57 |

Vapor pressure determinations show that the subject herbicidal esters prepared from 2-ethyl hexanol-1 have volatilities comparable to those prepared from tetrahydrofurfuryl alcohol and butoxyethanol, which are in common commercial use today.

I claim:

1. A cold stable herbicidal concentrated solvent solution of a 2-ethyl hexanol-1 ester of at least one halogenated phenoxyacetic acid selected from the group consisting of 4-chloro-2 methyl phenoxyacetic acid, 2,4-dichlorophenoxyacetic acid and 2,4,5-trichlorophenoxyacetic acid, said concentrated solvent solution containing at least four pounds of equivalent acid as the ester per gallon of solution.

2. A concentrated solvent solution as recited in claim 1 in which the solvent has a specific gravity between 0.8 and 1.0.

3. A concentrated solvent solution as recited in claim 1 in which the solvent is a high boiling naphtha.

4. A concentrated solvent solution as recited in claim 1 in which the solvent is kerosene.

5. A composition as recited in claim 1 in which the said concentrated solvent solution is mixed with an oil of low aromatic content.

6. A composition as recited in claim 5 in which the oil is fuel oil.

7. A composition as recited in claim 5 in which the oil is diesel oil.

8. An aqueous emulsion of a concentrated solvent solution as recited in claim 1.

References Cited in the file of this patent

UNITED STATES PATENTS 2,614,919 Warren _____ Oct. 21, 1952

OTHER REFERENCES

J. Amer. Chemical Society, vol. 69 (March 1947), page 722.

Thompson et al.: "Botanical Gazette," vol. 107 (1946), pages 475 to 507 (page 494 particularly relied upon).